(No Model.)

H. W. LIBBEY.

RUBBER COVERED ELASTIC COMPOUND.

No. 365,137. Patented June 21, 1887.

Witnesses.
E. Blanta.
J. George Settges.

Inventor
H. W. Libbey
by J. H. Adams
Attorney.

UNITED STATES PATENT OFFICE.

HOSEA W. LIBBEY, OF BOSTON, MASSACHUSETTS.

RUBBER-COVERED ELASTIC COMPOUND.

SPECIFICATION forming part of Letters Patent No. 365,137, dated June 21, 1887.

Application filed September 1, 1886. Serial No. 212,426. (No model.)

*To all whom it may concern:*

Be it known that I, HOSEA W. LIBBEY, a citizen of the United States, residing at Boston, in the county of Suffolk and State of Massachusetts, have invented a new and useful Improvement in Rubber-Covered Elastic Compounds, of which the following is a specification.

The object of my invention is to produce a material adapted for use in the construction of a great variety of articles, and which possesses in an eminent degree the elements of elasticity, lightness, and durability; and the invention consists in the combination of india-rubber and particles of sponge, to which may be added a sufficient quantity of sulphur for vulcanization of the compound when necessary, the whole to be covered by a layer of india-rubber made homogeneous with the inclosed compound.

Figure 1:
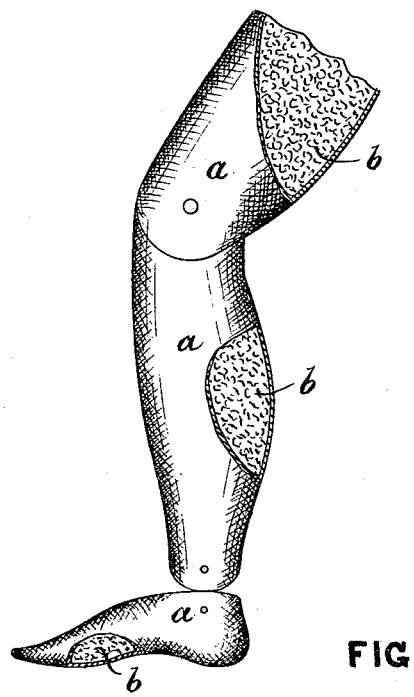
Figure 2:
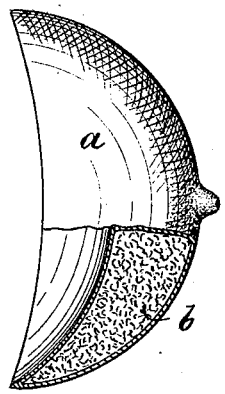
Figure 3:
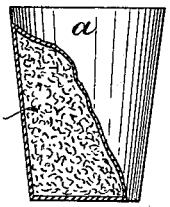
Figure 4:
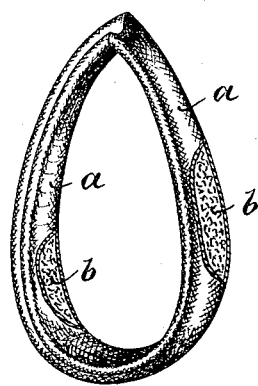
Figure 5:
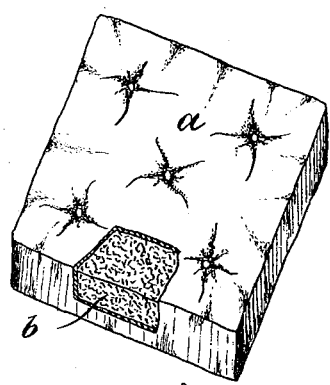

As specimens of some of the various uses to which my invention is applicable, I have represented in the accompanying drawings, in Figure 1, an artificial leg; Fig. 2, a false breast; Fig. 3, a bottle-stopper; Fig. 4, a horse-collar, and Fig. 5 a cushion.

In the several figures a portion of the outer covering is cut away to show the interior compound, designated by *b*, *a* being the outer covering.

In carrying out my invention I take a quantity of india-rubber or any of its compounds, and reduce the same by heat or by a chemical solvent to a liquid state, and then distribute in the mass particles of sponge and thoroughly mingle the same with the rubber; or particles of the rubber and of the sponge may be mixed together and then subjected to the action of heat to cause them to be thoroughly commingled. The compound thus formed is then covered by an outer envelope of rubber, and the whole is subjected to pressure, and then placed in molds of the shape corresponding to the article to be made.

What I claim as my invention is—

1. An elastic compound consisting of particles of sponge and india-rubber, to be used in articles of manufacture, prepared and commingled substantially as shown and described.

2. In combination with a compound of sponge and rubber, a covering of rubber on the outside of the said compound, as described.

In testimony whereof I have signed my name to this specification in the presence of two subscribing witnesses.

HOSEA W. LIBBEY.

Witnesses:
J. H. ADAMS,
E. PLANTA.